(12) United States Patent
Zhang et al.

(10) Patent No.: US 12,455,225 B2
(45) Date of Patent: Oct. 28, 2025

(54) PROCESS FOR EVALUATING CORROSION INHIBITOR BASED ON HIGH-THROUGHPUT CORROSION CHIP

(71) Applicant: University of Science and Technology Beijing, Beijing (CN)

(72) Inventors: Dawei Zhang, Beijing (CN); Lingwei Ma, Beijing (CN); Chenhao Ren, Beijing (CN); Jinke Wang, Beijing (CN); Xiaogang Li, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 602 days.

(21) Appl. No.: 17/936,946

(22) Filed: Sep. 30, 2022

(65) Prior Publication Data
US 2023/0408398 A1    Dec. 21, 2023

(30) Foreign Application Priority Data
Jun. 16, 2022    (CN) .......................... 202210677645.3

(51) Int. Cl.
*G01N 17/00* (2006.01)
(52) U.S. Cl.
CPC .................. *G01N 17/006* (2013.01)
(58) Field of Classification Search
CPC ......... G01N 17/006; G01N 1/28; G01N 21/84
See application file for complete search history.

(56) References Cited

U.S. PATENT DOCUMENTS

| | | | |
|---|---|---|---|
| 2019/0096761 A1* | 3/2019 | Nieh | H10D 30/6211 |
| 2022/0002175 A1* | 1/2022 | Moloney | C09K 8/54 |
| 2022/0135840 A1* | 5/2022 | Cheng | C09K 3/1463 |
| | | | 438/692 |
| 2022/0205112 A1* | 6/2022 | Kalakodimi | C23F 11/04 |

FOREIGN PATENT DOCUMENTS

CN          113063830 A  *  7/2021  ............. G01N 27/26

* cited by examiner

*Primary Examiner* — Lee E Rodak
*Assistant Examiner* — Zannatul Ferdous
(74) *Attorney, Agent, or Firm* — Stinson LLP

(57) ABSTRACT

The present disclosure discloses a process for evaluating a corrosion inhibitor based on a high-throughput corrosion chip. In the present disclosure, a high-throughput corrosion chip is first prepared by using a chip spotter, and only a corrosion inhibitor and a corrosive substance need to be spotted on a metal sample to quickly, efficiently, and accurately evaluate performance of a corrosion inhibitor formulation, to meet corrosion test conditions such as different substances, different concentrations, and different corrosion duration; and then a corrosion degree of each measurement point in the high-throughput corrosion chip is identified and quantified by using a laser scanning confocal microscope. The high-throughput corrosion chip prepared by using the foregoing method can bear 10-1000 measurement points, and these measurement points can reflect corrosion effects of different inhibitor formulations in different corrosion duration.

8 Claims, 3 Drawing Sheets

PROCESS FOR EVALUATING CORROSION INHIBITOR BASED ON HIGH-THROUGHPUT CORROSION CHIP

CROSS REFERENCE TO RELATED APPLICATION(S)

This patent application claims the benefit and priority of Chinese Patent Application No. 202210677645.3, filed on Jun. 16, 2022, the disclosure of which is incorporated by reference herein in its entirety as part of the present application.

TECHNICAL FIELD

The present disclosure belongs to the field of corrosion and protection technologies, and relates to a process for evaluating a corrosion inhibitor based on a high-throughput corrosion chip.

BACKGROUND ART

Various metal materials, such as steel and aluminum alloys, are quite susceptible to corrosion in their service environments. As a substance that can inhibit corrosion, a corrosion inhibitor is usually used in petroleum transportation, marine ships, chemical production, and other corrosive environments.

In recent years, efficient screening of corrosion inhibitors and composition of various corrosion inhibitors have attracted people's attention greatly. However, during selection of corrosion inhibitors, a researcher usually needs to select the most suitable corrosion inhibitor scheme from a large number of corrosion inhibitors and composition schemes of corrosion inhibitors based on a large number of experiments. Such experiments usually require a great quantity of manpower and material resources. Therefore, it is of great significance to develop a process for evaluating a corrosion inhibitor based on a high-throughput corrosion chip. In this study, a method for preparing a high-throughput corrosion chip and characterizing a corrosion degree of a corrosion measurement point on the chip is developed based on a precise and fast spotting function of a chip spotter and a three-dimensional graphic photographing function of a laser scanning confocal microscope.

SUMMARY

An objective of the present disclosure is to provide a process for evaluating a corrosion inhibitor based on a high-throughput corrosion chip based on a precise and fast spotting function of a chip spotter. The method can be used to prepare a high-throughput corrosion chip and obtain corrosion effects of a large number of solution corrosion schemes through characterization of corrosion measurement points on the chip in a short time period.

To achieve the above objective, the present disclosure adopts the following technical solution:

A process for evaluating a corrosion inhibitor based on a high-throughput corrosion chip is provided, where the high-throughput corrosion chip is prepared by dropwise adding a corrosion inhibitor solution and a corrosion solution to a metal surface, and a corrosion degree of each corrosion measurement point is reflected by characterizing a corrosion morphology of the corrosion measurement point.

Further, the mixed droplets are spotted on the polished metal surface by a chip spotter in a form of a high-density array, and a droplet volume is 20-500 nL.

Further, the corrosion morphology of the measurement point is characterized by a three-dimensional image of the measurement point generated through measurement by using a laser scanning confocal microscope, and the corrosion degree of the measurement point is reflected by characterizing a volume, a surface area, and surface roughness of the three-dimensional image.

Further, one or more corrosion inhibitors and the corrosion solution form a mixed solution, the corrosion inhibitor includes an inorganic corrosion inhibitor, an organic corrosion inhibitor, and a polymer corrosion inhibitor, and the corrosion solution includes an electrolyte solution, an acid/base substance solution, and an oxidizing substance solution.

The process for evaluating a corrosion inhibitor based on a high-throughput corrosion chip mentioned above includes the following steps:

(1) polishing the to-be-evaluated metal surface to form a mirror finish, and placing the metal surface in a working area of the chip spotter to keep the sample flat and dry;

(2) preparing a standard solution of each of multiple corrosion inhibitors and a corrosive substance that need to be evaluated, and placing the prepared standard solutions in a raw material area of a biochip spotter;

(3) in a dry environment, spotting the standard corrosion inhibitor solutions at specified array positions on the metal surface according to a required concentration and a required ratio by using the biochip spotter, to form, on the metal surface, a corrosion inhibitor solution droplet array prepared by mixing a single standard corrosion inhibitor solution or multiple standard corrosion inhibitor solutions at any ratio; and after the corrosion inhibitor solution droplets are dried, in a constant temperature and humidity environment, spotting the standard corrosive substance solution at the dried positions to form, on the metal surface, a mixed solution composed of one or more corrosion inhibitors and the corrosive substance; after the corrosion inhibitor solution droplets are dried, in a constant temperature and humidity environment, spotting the standard corrosive substance solution at the dried positions to form, on the metal surface, a mixed solution composed of one or more corrosion inhibitors and the corrosive substance;

(4) placing the metal spotted with the mixed solution in a constant temperature and humidity environment, and cleaning a measurement point with water and ethanol after the measurement point is formed on the metal surface; and (5) measuring each measurement point by using a laser scanning confocal microscope to generate a three-dimensional image, and obtaining corrosion degree information of each measurement point by evaluating the three-dimensional image of the measurement point.

Further, in step (2), a viscosity of the standard solution is 0-5 mPas.

Further, in step (3), an arrangement density of the solution droplets on the metal surface is 1-50 droplets/cm$^2$, and there are 10-1000 droplets in total.

Further, in step (5), the corrosion degree information is a surface morphology of a corrosion product at the measurement point, surface roughness of the corrosion product, surface roughness of the metal surface from which the corrosion product is removed, a volume of the corrosion product, a volume of a pit formed after the corrosion product is removed, and an average height of the corrosion product.

Further, the foregoing method can be used to obtain corrosion degree information in 10-1000 different solution corrosion schemes within 12 hours to efficiently evaluate corrosion inhibition performance of a corrosion inhibitor or a corrosion inhibitor formulation.

The present disclosure has the following advantages and outstanding technical effects: The high-throughput corrosion chip is prepared by using a chip spotter, and then a corrosion degree of each measurement point in the corrosion chip is identified and evaluated by using a laser scanning confocal microscope. The high-throughput corrosion chip prepared by using the foregoing method can bear 10-1000 measurement points, and these measurement points can reflect corrosion effects of different inhibitor formulations in different corrosion duration. This process for evaluating a corrosion inhibitor based on a high-throughput corrosion chip has advantages such as a high preparation speed, a simple test manner, a large amount of data, a short test period, and small man-made test interference, and has broad application prospects in fields such as corrosion inhibitor screening, formulation optimization, and corrosion control.

DETAILED DESCRIPTION OF THE EMBODIMENTS

The present disclosure is further described below with reference to the accompanying drawings and examples. The following examples are illustrative rather than limiting, and the protection scope of the present disclosure cannot be limited by the following examples.

Example 1

1. A 60 mm×80 mm×1 mm steel sheet was polished to form a mirror finish and placed in a working area of a biochip spotter, a 0.2 g/L standard cerium nitrate solution and a 3.5% standard sodium chloride solution were prepared and were placed in a raw material area of the biochip spotter.

2. In an environment with a humidity of 10% and a temperature of 25° C., ten columns of the cerium nitrate solution were spotted, where there were five droplets in each column, and a volume of each droplet is 200 nL. After the droplets were dried, in an environment with a humidity of 100% and a temperature of 25° C., ten columns of the standard 3.5% sodium chloride solution were spotted finally, where each column was a droplet matrix including five droplets and the droplets covered positions at which last spotting was conducted, a spotting volume of each droplet was 200 nL, and a spotting time interval between two columns was 15 minutes.

3. The steel sheet spotted with the above droplets was placed in an environment with a saturated humidity and a temperature of 25° C. for 15 minutes, and measurement points were cleaned after the measurement points were formed on the surface of the steel sheet.

4. Each measurement point was measured by using a laser scanning confocal microscope to generate a three-dimensional image. Corrosion degree information of each measurement point was obtained by evaluating the three-dimensional image of the measurement point.

Figure 1:
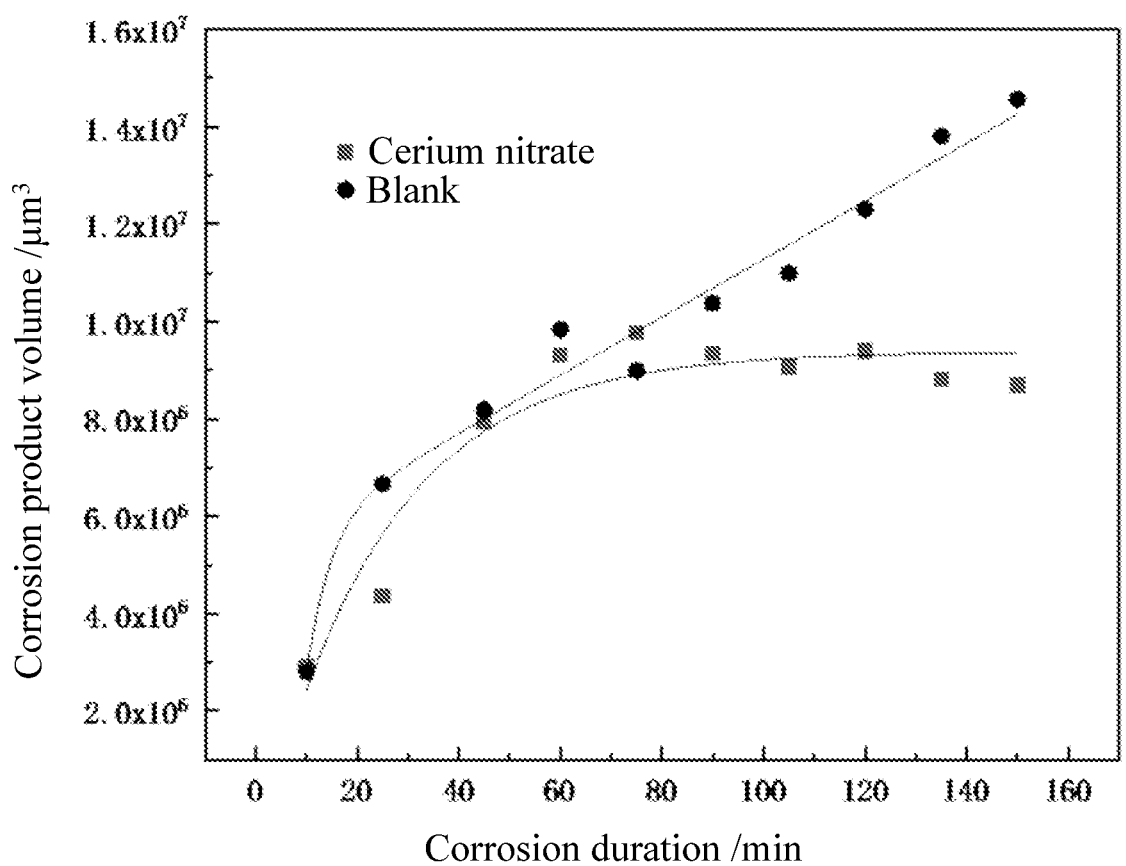
FIG. 1 is a chart of corrosion inhibition effects of cerium nitrate on a steel sheet at different time points, that is, corrosion degree information that is obtained from three-dimensional images of measurement points and that is of a corrosion chip prepared in Example 1.

FIG. 1 shows corrosion degree information that is obtained from three-dimensional images of measurement points and that is of a high-throughput corrosion chip prepared in Example 1, that is, corrosion product volumes of all the measurement points. After the steel sheet was soaked in the 0.2 g/L cerium nitrate solution for 75 minutes, a corrosion inhibition effect of cerium nitrate started to be achieved.

Example 2

1. A 60 mm×80 mm×1 mm steel sheet was polished to form a mirror finish and placed in a working area of a biochip spotter, a 0.2 g/L standard zinc chloride solution, a 0.2 g/L standard cerium nitrate solution, a 0.2 g/L standard cerium ammonium nitrate solution, a 0.2 g/L standard sodium phosphate solution, a 0.2 g/L standard sodium oxalate solution, a 0.2 g/L standard sodium molybdate solution, a 0.2 g/L standard sodium tripolyphosphate solution, a 0.2 g/L standard DMA solution, a 0.2 g/L standard sodium gluconate solution, a 0.2 g/L standard sodium salicylate solution, a 0.2 g/L standard CTAB solution, a 0.2 g/L standard SDS solution, a g/L standard PEG solution, a 0.2 g/L standard PVA solution, a 0.2 g/L standard Tween 80 solution, and a 7% standard sodium chloride solution were prepared and were placed in a raw material area of the biochip spotter.

2. In an environment with a humidity of 20% and a temperature of 25° C., the standard zinc chloride solution, the standard cerium nitrate solution, the standard cerium ammonium nitrate solution, the standard sodium phosphate solution, the standard sodium oxalate solution, the standard sodium molybdate solution, and the standard sodium tripolyphosphate solution were spotted, where 18 horizontally arranged droplets were spotted for each type of solution, and a spotting volume of each droplet was 50 nL. Then, the standard DMA solution, the standard sodium gluconate solution, the standard sodium salicylate solution, the standard CTAB solution, the standard SDS solution, the standard PEG solution, the standard PVA solution, and the standard Tween 80 solution were spotted, where 16 vertically arranged droplets were spotted for each type of solution and covered positions at which the first spotting was conducted, and a spotting volume of each droplet was 50 nL. After the corrosion inhibitor droplets were dried, in an environment with a humidity of 70% and a temperature of 25° C., the 3.5% standard sodium chloride solution was spotted finally, where the spotted solution was a 16×18 droplet matrix and covered positions at which the first two times of spotting was conducted, and a spotting volume of each droplet was 100 nL.

3. The steel sheet spotted with the above droplets was placed in an environment with a saturated humidity and a temperature of 25° C. for 5 hours, and measurement points were cleaned with water and ethanol after the measurement points were formed on the surface of the steel sheet.

4. Each measurement point was measured by using a laser scanning confocal microscope to generate a three-dimensional image. Corrosion degree information of each measurement point was obtained by evaluating the three-dimensional image of the measurement point.

Figure 2:
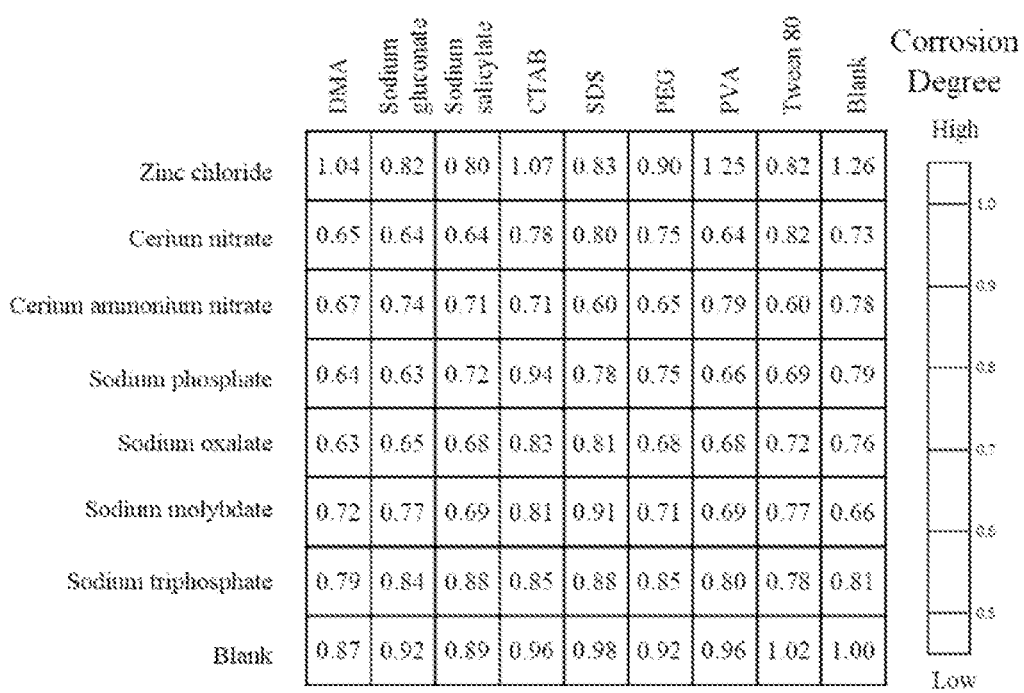
FIG. 2 is a chart of corrosion inhibition performance achieved by composition of multiple compounded corrosion inhibitors, that is, corrosion degree information that is obtained from three-dimensional images of measurement points and that is of a corrosion chip prepared in Example 2.

FIG. 2 shows corrosion degree information that is obtained from three-dimensional images of measurement points and that is of a corrosion chip prepared in Example 2, that is, average heights of corrosion products. Cerium nitrate and sodium gluconate, cerium nitrate and sodium salicylate, sodium phosphate and sodium gluconate, and cerium ammonium nitrate and SDS have relatively good synergistic corrosion inhibition effects at a specified concentration.

Example 3

1. A 60 mm×80 mm×1 mm steel sheet was polished to form a mirror finish and placed in a working area of a biochip spotter, a standard cerium nitrate solution with a mass fraction of 0.5 g/L, a standard sodium gluconate solution with a mass fraction of 0.5 g/L, and a 3.5% standard sodium chloride solution were prepared and were placed in a raw material area of the biochip spotter.

2. In an environment with a humidity of 20% and a temperature of 25° C., 20 columns of the cerium nitrate solution were spotted, where there were 20 droplets in each column, and spotting volumes of the columns are in an ascending order from 0 nL to 100 nL. 20 rows of the sodium gluconate solution were spotted, where there were 20 droplets in each row, spotting volumes of the rows are in an ascending order from 0 nL to 100 nL, and the droplets covered positions at which the first spotting was conducted. After the droplets were dried, in an environment with a humidity of 80% and a temperature of 25° C., the 3.5% standard sodium chloride solution was spotted finally, where the spotted solution was a 20×20 droplet matrix and covered positions at which the first two times of spotting was conducted, and a spotting volume of each droplet was 200 nL.

3. The steel sheet spotted with the above droplets was placed in an environment with a saturated humidity and a temperature of 25° C. for 2.5 hours, and measurement points were cleaned after the measurement points were formed on the surface of the steel sheet.

4. Each measurement point was measured by using a laser scanning confocal microscope to generate a three-dimensional image. Corrosion degree information of each measurement point was obtained by evaluating the three-dimensional image of the measurement point.

Figure 3:
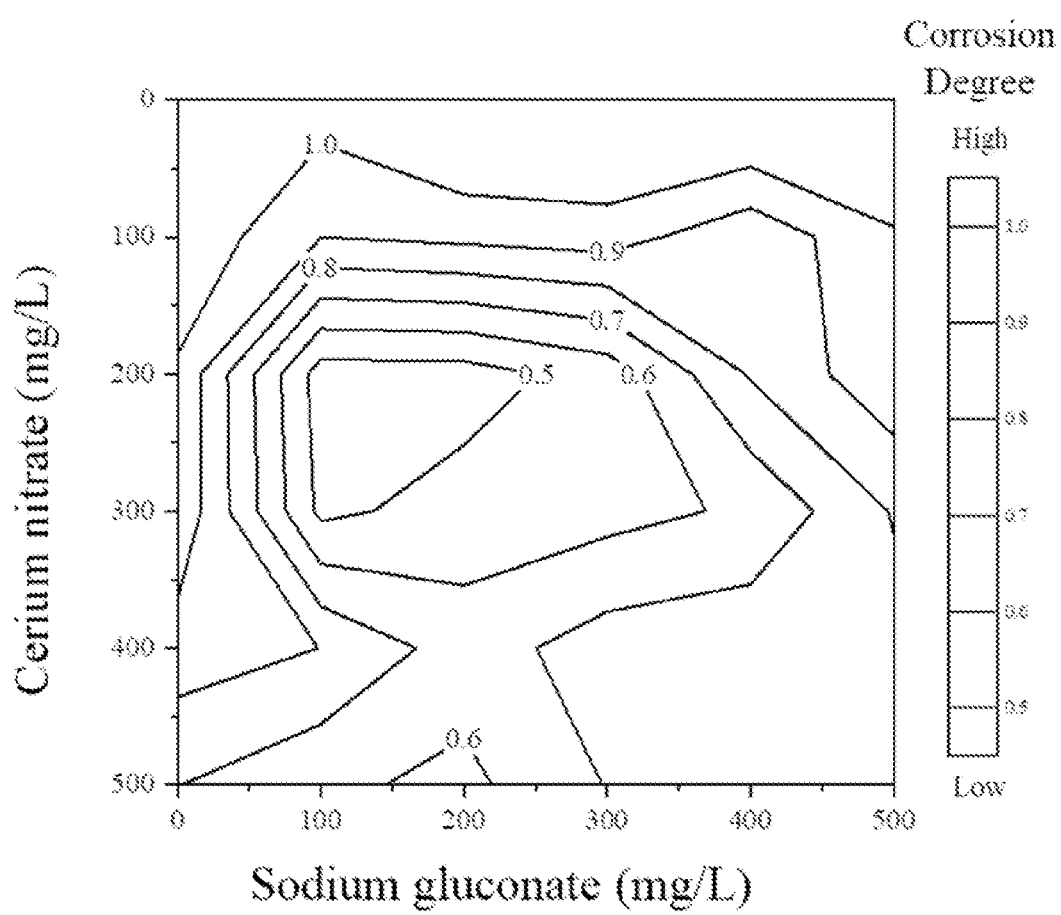
FIG. 3 is a chart of composite effects of cerium nitrate and sodium gluconate at gradient concentrations, that is, corrosion degree information that is obtained from three-dimensional images of measurement points and that is of a corrosion chip prepared in Example 3.

FIG. 3 shows corrosion degree information that is obtained from three-dimensional images of measurement points and that is of a high-throughput corrosion chip prepared in Example 3, that is, corrosion product volumes of all the measurement points. 0.2 g/L cerium nitrate and 0.1 g/L sodium gluconate have a good synergistic corrosion inhibition effect.

What is claimed is:

1. A process for evaluating a corrosion inhibitor based on a high-throughput corrosion chip, wherein the high-throughput corrosion chip is prepared by dropwise adding a corrosion inhibitor solution and a corrosion solution to a metal surface, a corrosion degree of each corrosion measurement point is reflected by characterizing a corrosion morphology of the corrosion measurement point, and a site corroded by a single droplet is referred to as a measurement point below; and the process comprises the following steps:
(1) polishing a to-be-evaluated metal surface to form a mirror finish, and placing a polished metal surface in a working area of a chip spotter to keep the polished metal surface flat and dry;
(2) preparing standard solutions of each of multiple corrosion inhibitors and a corrosive substance that need to be evaluated, and placing the standard solutions in a raw material area of a biochip spotter;
(3) in a dry environment, spotting standard corrosion inhibitor solutions at specified array positions on the polished metal surface according to a required concentration and a required ratio by using the biochip spotter, to form, on the polished metal surface, a corrosion inhibitor solution droplet array prepared by mixing one of the standard corrosion inhibitor solutions or multiple of the standard corrosion inhibitor solutions at any ratio; and after corrosion inhibitor solution droplets are dried, in a constant temperature and humidity environment, spotting a standard corrosive substance solution at the dried positions to form, on the polished metal surface, a mixed solution composed of one or more corrosion inhibitors and the corrosive substance;
(4) placing a metal spotted with the mixed solution in a constant temperature and humidity environment, and cleaning a measurement point with water and ethanol after the measurement point is formed on the polished metal surface; and
(5) measuring the measurement point by using a laser scanning confocal microscope to generate a three-dimensional image, and obtaining corrosion degree information of the measurement point by evaluating the three-dimensional image of the measurement point.

2. The process according to claim 1, wherein mixed droplets are spotted on the polished metal surface by the chip spotter in a form of a high-density array, and wherein each of the mixed droplets has a droplet volume of 20-500 nL.

3. The process according to claim 1, wherein the corrosion morphology of the measurement point is characterized by the three-dimensional image of the measurement point generated through measurement by using the laser scanning confocal microscope, and the corrosion degree of the measurement point is reflected by characterizing a volume, a surface area, and surface roughness of the three-dimensional image.

4. The process according to claim 1, wherein the corrosion inhibitor comprises an inorganic corrosion inhibitor, an organic corrosion inhibitor, and a polymer corrosion inhibitor, and the corrosion solution comprises an electrolyte solution, an acid/base substance solution, and an oxidizing substance solution.

5. The process according to claim 1, wherein in step (2), a viscosity of each of the standard solutions is 0-5 mPas.

6. The process according to claim 1, wherein in step (3), an arrangement density of the mixed solution droplets on the polished metal surface is 1-50 droplets/cm$^2$, and there are 10-1000 droplets in total.

7. The process according to claim 1, wherein in step (5), the corrosion degree information is a surface morphology of a corrosion product at the measurement point, surface roughness of the corrosion product, surface roughness of the metal surface from which the corrosion product is removed, a volume of the corrosion product, a volume of a pit formed after the corrosion product is removed, and an average height of the corrosion product.

8. The process according to claim 1 for use in obtaining corrosion degree information in 10-1000 different solution corrosion schemes within 12 hours, to efficiently evaluate corrosion inhibition performance of a corrosion inhibitor or a corrosion inhibitor formulation.

* * * * *